(12) United States Patent
Yanagisawa et al.

(10) Patent No.: US 8,307,846 B2
(45) Date of Patent: Nov. 13, 2012

(54) PRESSURE CONTROL VALVE

(75) Inventors: Shu Yanagisawa, Tokyo (JP); Ryo Matsuda, Tokyo (JP); Daisuke Watari, Tokyo (JP); Hiroshi Yokota, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 769 days.

(21) Appl. No.: 12/385,030

(22) Filed: Mar. 30, 2009

(65) Prior Publication Data
US 2009/0242810 A1 Oct. 1, 2009

(30) Foreign Application Priority Data
Mar. 31, 2008 (JP) .................... 2008-091840

(51) Int. Cl.
*F16K 31/126* (2006.01)
(52) U.S. Cl. .............. 137/510; 137/906; 251/61.2
(58) Field of Classification Search .......... 137/510, 137/906, 494, 509; 251/61, 61.2, 61.3, 61.4, 251/61.5, 63
See application file for complete search history.

(56) References Cited

U.S. PATENT DOCUMENTS

| | | | | | |
|---|---|---|---|---|---|
| 2,178,876 | A | * | 11/1939 | MacClatchie | 137/329.04 |
| 2,181,428 | A | * | 11/1939 | Grove | 137/509 |
| 3,079,946 | A | * | 3/1963 | Rosler | 137/509 |
| 3,689,025 | A | * | 9/1972 | Kiser et al. | 251/25 |
| 3,999,553 | A | * | 12/1976 | Spitz et al. | 604/10 |
| 4,763,841 | A | * | 8/1988 | Hafner et al. | 239/464 |
| 6,035,889 | A | * | 3/2000 | Mangano et al. | 137/529 |

FOREIGN PATENT DOCUMENTS
JP 07-332807 12/1995
* cited by examiner

*Primary Examiner* — William McCalister
(74) *Attorney, Agent, or Firm* — Bacon & Thomas, PLLC

(57) ABSTRACT

A pressure control valve is provided with a valve main body (10) having a valve chamber (15) with a valve seat portion (14), a refrigerant inflow port (11) and a refrigerant outflow port (12), and a pressure response element (30) having a diaphragm (20) defining an upper surface of a valve chamber (15) and driving a valve body (17) and a lid-like member (35) defining a sealed pressure chamber (25) together with the diaphragm (20) and having a concave portion (36), an inert gas having a thermal expansion coefficient not more than a predetermined value is enclosed within said sealed pressure chamber (25), and an internal volume of the sealed pressure chamber is set such that the valve body (17) comes to a full-open state when that the pressure of the valve chamber (18) becomes a predetermined pressure or more higher than the pressure at which said valve body starts opening.

3 Claims, 6 Drawing Sheets

PRESSURE CONTROL VALVE

BACKGROUND OF THE INVENTION

1. Field of the Invention

The present invention relates to a pressure control valve, for example, a pressure control valve which is used in a car air conditioner or the like, and is provided with a pressure response element constructed by a diaphragm or the like.

2. Description of the Conventional Art

As this type of pressure control valve, in conventional, for example, there has been known a structure as shown in the following Japanese Unexamined Patent Publication No. 7-332807. The pressure control valve is provided with one pressure chamber (in which a gas having a comparatively great thermal expansion coefficient is enclosed) in which an internal pressure is changed in response to a temperature change of a certain specific position, the other pressure chamber in which an internal pressure is changed in response to a temperature change of a refrigerant, a diaphragm for comparting the one pressure chamber and the other pressure chamber, a valve body for changing a valve opening degree in connection with a displacement of the diaphragm, a coil spring for energizing the valve body, and the like. The valve body is structured such as to be displaced to a position where the internal pressure of the one pressure chamber, which acts in such a direction as to make the valve opening degree large, balances with the internal pressure of the other pressure chamber and the energizing force of the coil spring, which act in such a direction as to make the valve opening degree small.

SUMMARY OF THE INVENTION

Problem to be Solved by the Invention

The conventional pressure control valve as mentioned above requires the coil spring or the like in addition to the diaphragm, and its structure becomes complicated, thereby causing a cost increase. Accordingly, it is strongly desired to further simplify the structure, reduce the number of parts, and reduce a working and assembling cost. Further, it is demanded to achieve improvement of control precision and enlargement of a control range, that is, to achieve a linear relation between the valve opening degree and the refrigerant pressure (to make a control characteristic line as a straight line having a comparatively gentle inclination).

The present invention is made by taking the circumstance mentioned above into consideration, and an object of the present invention is to provide a compactly arranged pressure control valve whereby simplification of a structure, reduction of the number of parts, reduction of a working and assembling cost and the like can be achieved, and improvement of a control precision and enlargement of a control range can be achieved as well.

Means for Solving the Problem

In order to achieve the object mentioned above, the present invention is basically a pressure control valve comprising:

a valve main body provided with a valve chamber having a valve seat portion which a rod-shaped valve body moves close to and away from, an inflow port, and an outflow port; and a pressure response element having a diaphragm defining an upper surface of the valve chamber and driving the valve body in an opening and closing direction, and a lid-like member defining a sealed pressure chamber in cooperation with the diaphragm, wherein an inert gas having a thermal expansion coefficient equal to or less than a predetermined value is enclosed within the sealed pressure chamber, and an internal volume of the sealed pressure chamber is set such that the valve body comes to a full-open state in the case that the pressure of the valve chamber becomes a predetermined pressure or more higher than the pressure at which the valve body starts opening.

A single gas such as nitrogen, helium or the like or a mixed gas including them is used as the inert gas, preferably.

In accordance with a preferable aspect, an upper end portion of the valve body is bonded to the diaphragm, the valve body is provided with a vertical hole with an upper surface opening, and a connection hole for connecting the sealed pressure chamber and the vertical hole is formed in the diaphragm to expand the sealed pressure chamber.

In accordance with another preferable aspect, the lid-like member is formed in a concave shape and has a concave portion.

In accordance with a more preferable aspect, the internal volume of the sealed pressure chamber is set such that a ratio Vmin/Vmax becomes equal, to or less than 0.7, where Vmax denotes an internal volume of the sealed pressure chamber at a time when the valve body is in a full-close state, and Vmin denotes an internal volume of the sealed pressure chamber at a time when the valve body is in a full-open state.

Effect of the Invention

In the pressure control valve in accordance with the present invention, since the inert gas having the thermal expansion coefficient equal to or less than the predetermined value is enclosed within the sealed pressure chamber, and the internal volume of the sealed pressure chamber is set such that the valve body comes to the full-open state in the case that the pressure of the valve chamber becomes the predetermined pressure or more higher than the pressure at which the valve body starts opening, the inert gas enclosed in the sealed pressure chamber serves as a spring for energizing the valve body, for example, in a valve closing direction. Accordingly, the diaphragm and the valve body are displaced to a position where the internal pressure of the sealed pressure chamber, which acts in the valve closing direction, balances with the pressure of the valve chamber (a refrigerant), which act in the valve opening direction, and thereby a valve opening degree (a lift amount) is regulated.

In this case, the smaller the internal volume is, the more the internal pressure of the sealed pressure chamber is affected by a capacity change at a time of valve opening. In other words, as seen from a control characteristic shown in FIG. 5 by setting a vertical axis to the valve opening degree (the lift amount) and setting a horizontal axis to the pressure (PH) of the valve chamber (the refrigerant), the valve opening degree and the refrigerant pressure have a linear relation (the control characteristic line becomes an inclined straight line). Then, in the case that the internal volume of the sealed pressure chamber is large, the full-open state is achieved only by a little increase of the pressure (the pressure Pu) in the valve chamber (the refrigerant) from the pressure Pa at which the valve body starts opening (the inclination of the control characteristic line is sharp), however, in the case that the internal volume of the sealed pressure chamber is small, the full-open state is not achieved until the pressure of the valve chamber (the refrigerant) rises up to a certain level (the pressure Pv) from the pressure Pa at which the valve body starts opening (the inclination of the control characteristic line is gentle).

In this case, in the light of achieving improvement of the control precision and enlargement of the control range, it is preferable that the inclination of the control characteristic line is gentle.

Further, FIG. 6 shows a control characteristic in the case of changing the ratio Vmin/Vmax=α, where Vmax denotes the internal volume of the sealed pressure chamber at a time when the valve body is in the full-close state, and Vmin denotes the internal volume of the sealed pressure chamber at a time when the valve body is in the full-open state. From FIG. 6, it is understood that, in order to achieve the improvement of the control precision and the enlargement of the control range, the internal volume of the sealed pressure chamber is preferably set such that the ratio Vmin/Vmax=α becomes equal to or less than 0.7.

As mentioned above, in the pressure control valve in accordance with the present invention, since the inert gas having the thermal expansion coefficient equal to or less than the predetermined value is enclosed within the sealed pressure chamber, and the inert gas is utilized as a spring, the pressure control valve is not affected by the temperature of the refrigerant so much, and the coil spring or the like which has been necessary conventionally is not required. Accordingly, it is possible to achieve simplification of the structure, reduction of the number of parts, reduction of the working and assembling cost, and the like, and it is possible to achieve improvement of the control precision and enlargement of the control range, by setting the internal volume of the sealed pressure chamber as mentioned above.

In addition, since the sealed pressure chamber is expanded, for example, by setting the vertical hole having the upper surface opening in the valve body, and forming the lid-like member in a concave shape to have the concave portion, a desired control characteristic can be obtained only by changing dimensions of the vertical hole or the concave portion provided in one member (the valve body or the lid member) In other words, in the case of manufacturing plural kinds of pressure control valves having different specifications (control characteristics), the other members can be used in common only by changing one member (the valve body or the lid member), and it is thus possible to reduce a manufacturing cost.

DETAILED DESCRIPTION OF PREFERRED EMBODIMENT

A description will be given below of an embodiment of a pressure control valve in accordance with the present invention with reference to the accompanying drawings.

Figure 1A:
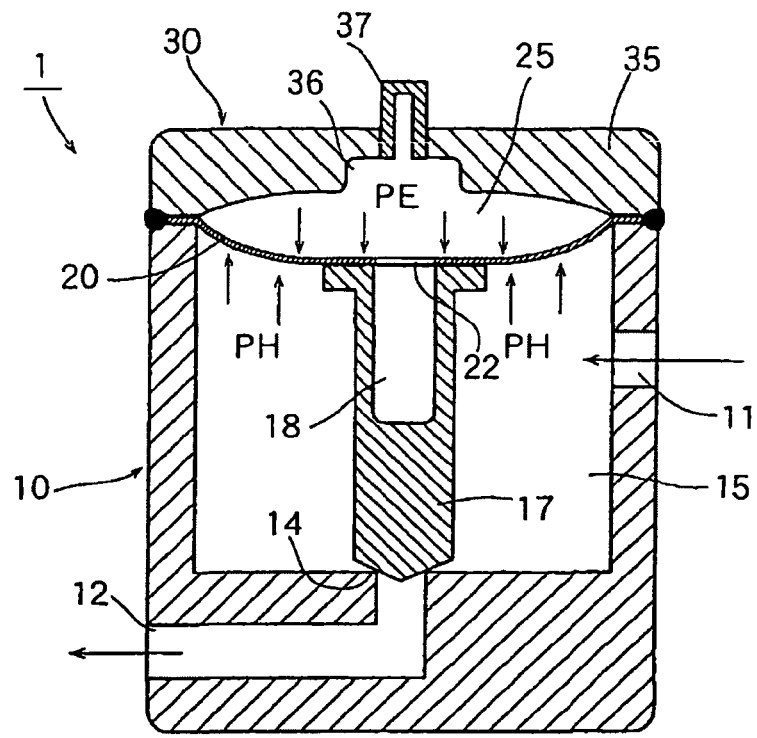
FIG. 1 is a sectional view showing an embodiment of a pressure control valve in accordance with the present invention.
Figure 1B:
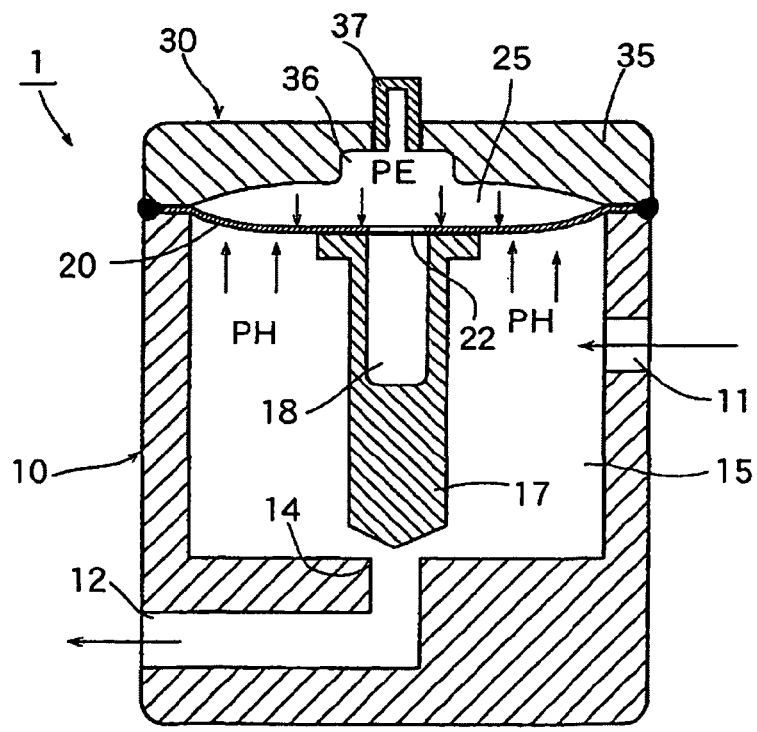

FIG. 1 is a sectional view showing an embodiment of the pressure control valve in accordance with the present invention, in which FIG. 1A shows a full-close state, and FIG. 1B shows a full-open state.

A pressure control valve 1 in an illustrated embodiment is provided with a valve main body 10 having a valve chamber 15 with a valve seat portion 14 which a rod-like valve body 17 moves close to and away from, a refrigerant inflow port 11 and a refrigerant outflow port 12, and a pressure response element 30 having a diaphragm 20 defining an upper surface of the valve chamber 15 and driving the valve body 17 in opening and closing directions, and a lid-like member 35 defining a sealed pressure chamber 25 in cooperation with the diaphragm 20, having a concave portion 36 and being formed to have a concave shape. An outer peripheral end portion of the diaphragm 2 is held by and between an upper end surface of the valve main body 10 and a lower end surface of the lid-like member 35, and these three elements are sealed and bonded by welding or the like.

An inert gas such as nitrogen or the like having a thermal expansion coefficient equal to or less than a predetermined value is enclosed within the sealed pressure chamber 25, and a sealing plug 37 is tightly fitted to a ceiling portion of the concave portion 36 of the lid-like member 35.

Further, an upper end portion of the valve body 17 is bonded to the diaphragm 20 by welding or the like, the valve body 17 is provided with a vertical hole 18 being open in its upper surface and having a predetermined depth, and a connection hole 22 for connecting the sealed pressure chamber 25 and the vertical hole 18 is formed in the diaphragm 20 to expand the sealed pressure chamber 25.

Further, in the present embodiment, an internal volume of the sealed pressure chamber 25 is set such that the valve body 17 comes to a full-open state in the case that the pressure of the valve chamber (the refrigerant) 15 becomes a predetermined pressure or more higher than a pressure at which the valve body 17 starts opening.

In the pressure control valve 1 having the structure mentioned above, since the inert gas having the thermal expansion coefficient equal to or less than the predetermined value is enclosed within the sealed pressure chamber 25, and the internal volume of the sealed pressure chamber 25 is set such that the valve body 17 comes to the full-open state at a time when the pressure of the valve chamber 15 (the refrigerant) becomes the predetermined pressure or more higher than the pressure at which the valve body 17 starts opening, the inert gas enclosed in the sealed pressure chamber 25 serves as a spring for energizing the valve body, for example, in the valve closing direction. Accordingly, the diaphragm 20 and the valve body 17 are displaced to a position where an internal pressure PE of the sealed pressure chamber 25, which acts in the valve closing direction, balances with a pressure PH of the valve chamber (the refrigerant) 15, which acts in the valve opening direction, and thereby a valve opening degree (a lift amount) is regulated.

Figure 5:
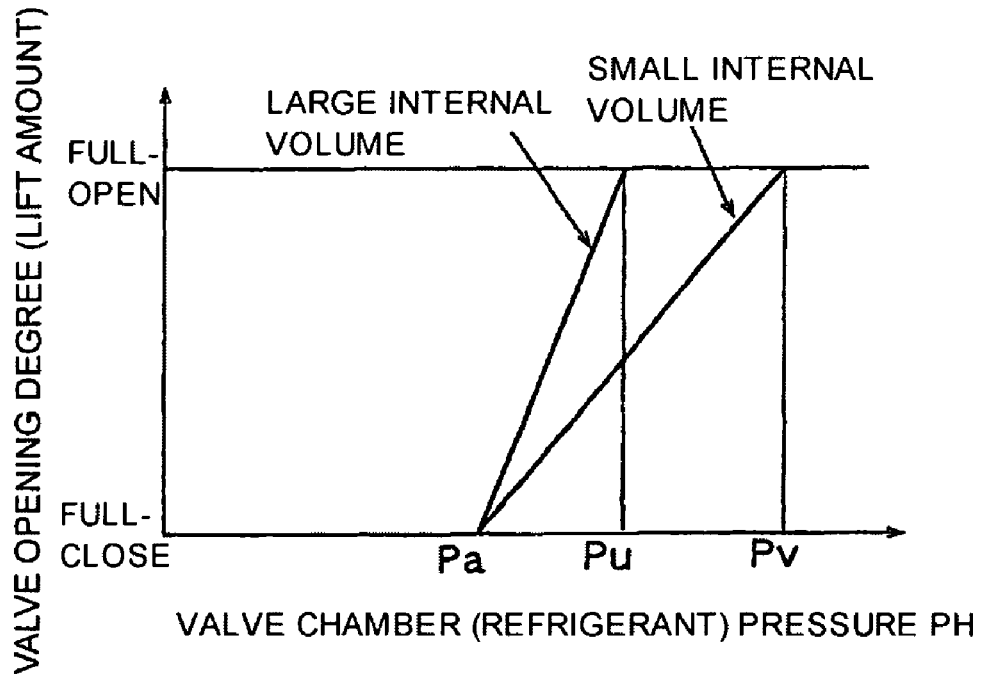
FIG. 5 is a graph provided for explaining a control characteristic of the pressure control valve in accordance with the present invention.

In this case, the smaller the internal volume is, the more the internal pressure of the sealed pressure chamber 25 is affected by the capacity change at a time of valve opening. In other words, as seen from a control characteristic shown in FIG. 5 by setting a vertical axis to the valve opening degree (the lift amount) and setting a horizontal axis to the pressure (PH) of the valve chamber (the refrigerant), the valve opening degree and the refrigerant pressure have a linear relation (the control characteristic line becomes an inclined straight line). Then, in the case that the internal volume of the sealed pressure chamber 25 is large, the full-open state is achieved only by a little increase of the pressure PH (the pressure Pu) in the valve chamber (the refrigerant) 15 from the pressure Pa at which the valve body 17 starts opening (the inclination of the control characteristic line is sharp), however, in the case that the internal volume of the sealed pressure chamber 25 is small, the full-open state is not achieved until the pressure PH of the valve chamber (the refrigerant) 15 rises up to a certain level (the pressure Pv) from the pressure Pa at which the valve body 17 starts opening (the inclination of the control characteristic line is gentle).

In this case, in the light of achieving improvement of the control precision and enlargement of the control range, since it is preferable that the inclination of the control characteristic line is gentle, the internal volume of the sealed pressure chamber 25 in the pressure control valve 1 in accordance with the present embodiment is made comparatively small (mentioned below).

Figure 6:
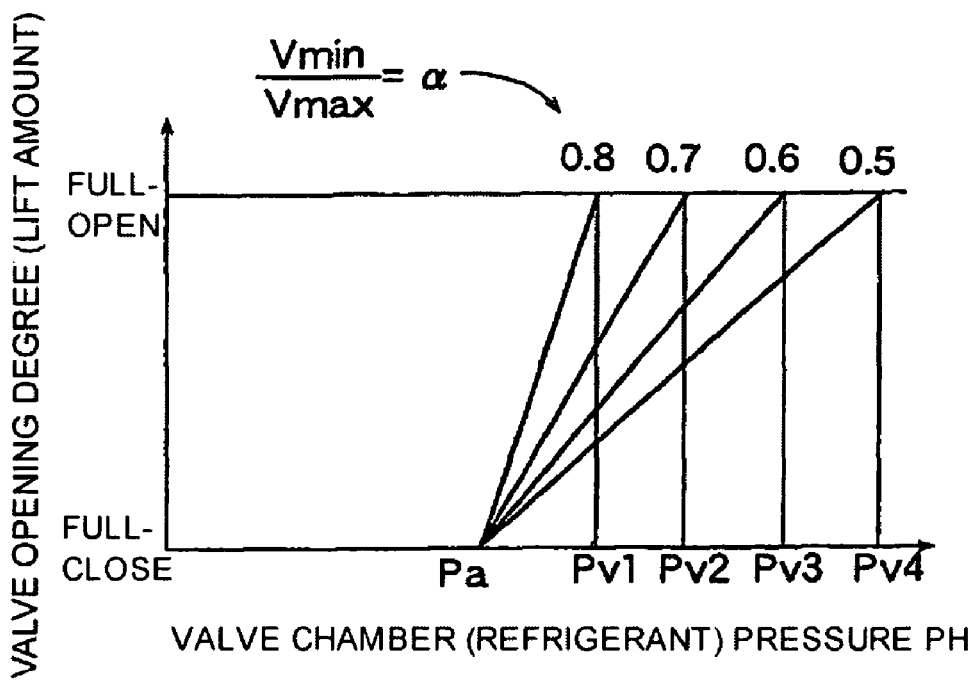
FIG. 6 is a graph provided for explaining a control characteristic of the pressure control valve in accordance with the present invention.

Further, FIG. 6 shows a control characteristic in the case of changing the ratio Vmin/Vmax=$\alpha$, where Vmax denotes the internal volume of the sealed pressure chamber 25 at a time when the valve body 17 is in the full-close state, and Vmin denotes the internal volume of the sealed pressure chamber 25 at a time when the valve body 7 is in the full-open state. From FIG. 6, it is understood that, in order to achieve the improvement of the control precision and the enlargement of the control range, the internal volume of the sealed pressure chamber is preferably set such that the ratio Vmin/Vmax=$\alpha$ becomes equal to or less than 0.7. On the basis of this fact, in the present embodiment, the internal volume of the sealed pressure chamber 25 is set such that the ratio Vmin/Vmax=$\alpha$ becomes, for example, 0.6 (the full-open state is achieved at a time when the pressure PH of the valve chamber (the refrigerant) becomes Pv3).

As mentioned above, in the pressure control valve 1 in accordance with the present invention, since the inert gas having the thermal expansion coefficient equal to or less than the predetermined value is enclosed within the sealed pressure chamber 25, and the inert gas is utilized as the spring, the pressure control valve is not affected by the temperature of the refrigerant so much, and the coil spring or the like, which has been necessary conventionally, is not required. Accordingly, it is possible to achieve simplification of the structure, reduction of the number of parts, reduction of the working and assembling cost, and the like, and it is possible to achieve improvement of the control precision and enlargement of the control range, by setting the internal volume of the sealed pressure chamber 25 as mentioned above.

Figure 2A:
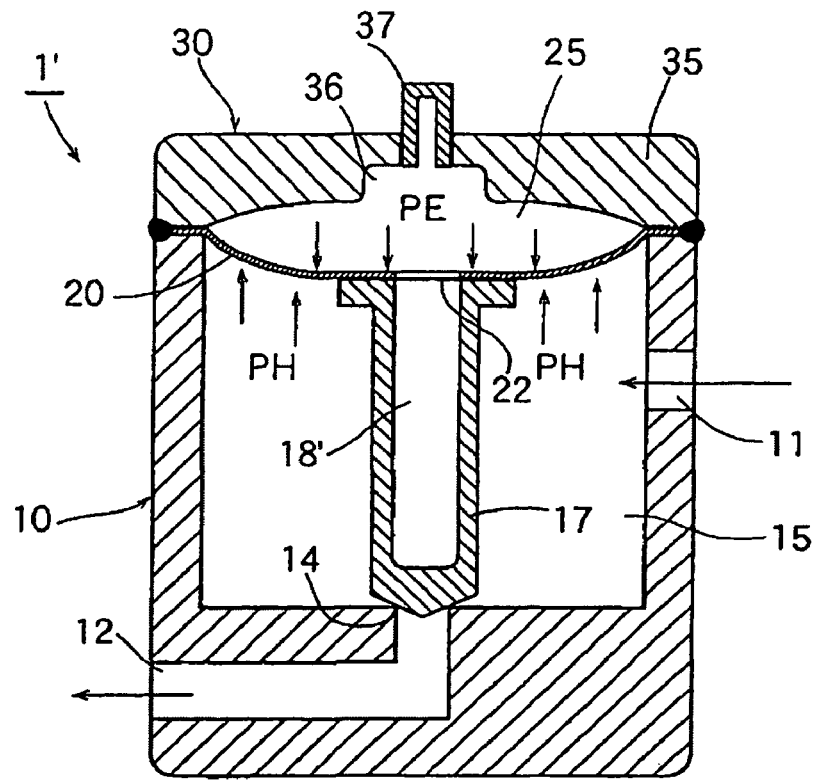
FIG. 2 is a sectional view showing an embodiment in which the specification of the pressure control valve shown in FIG. 1 is changed.
Figure 2B:
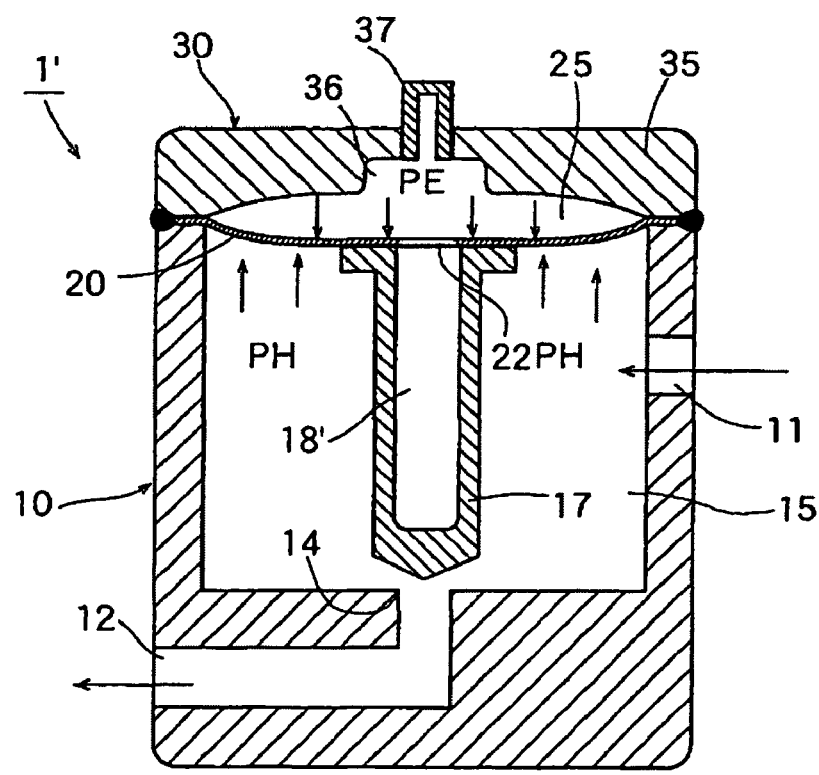
Figure 3A:
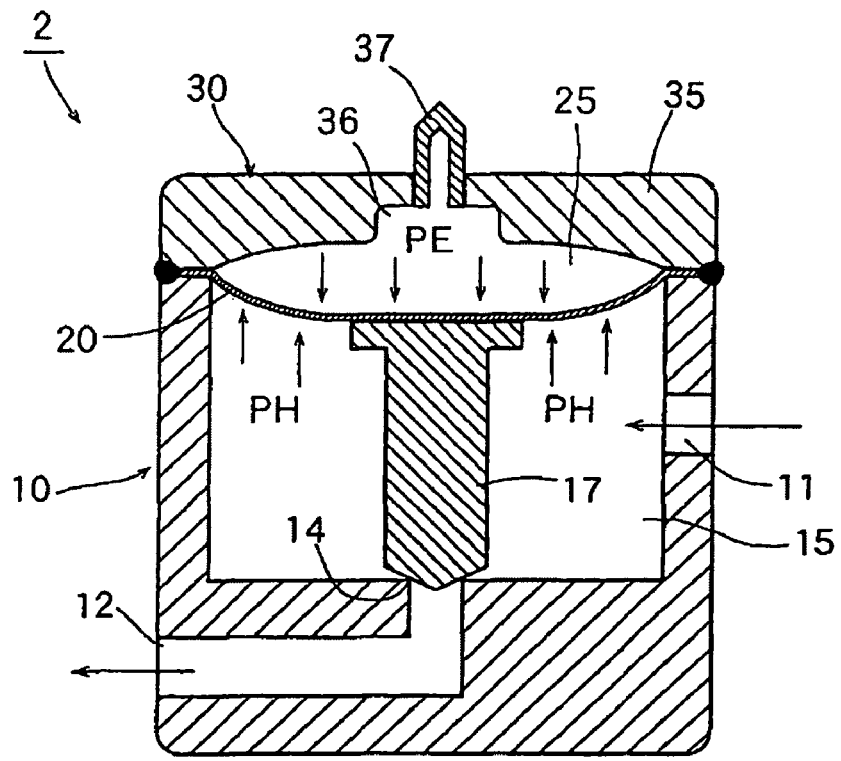
FIG. 3 is a sectional view showing another embodiment of the pressure control valve in accordance with the present invention.
Figure 3B:
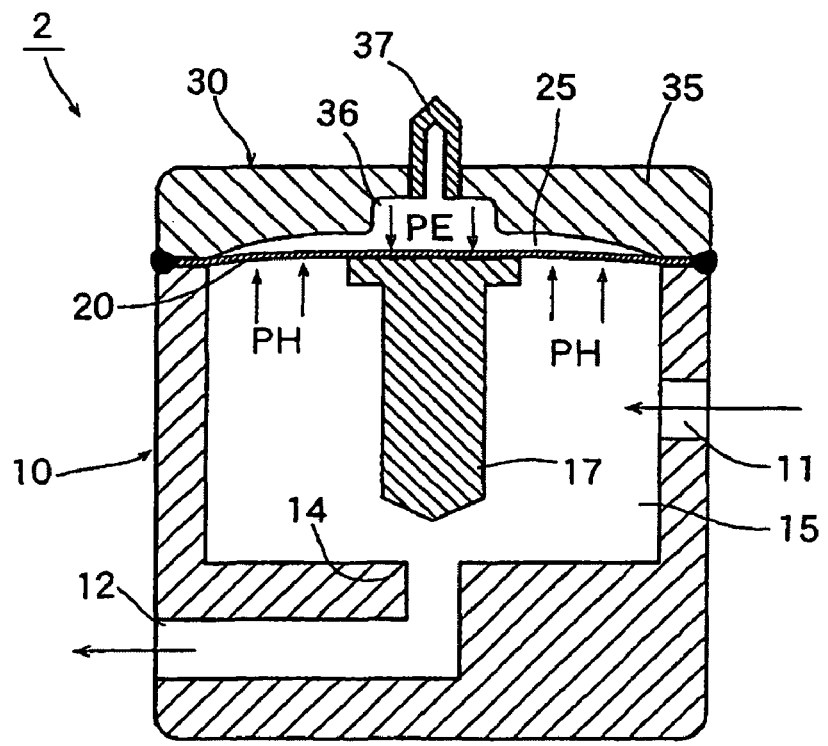
Figure 4A:
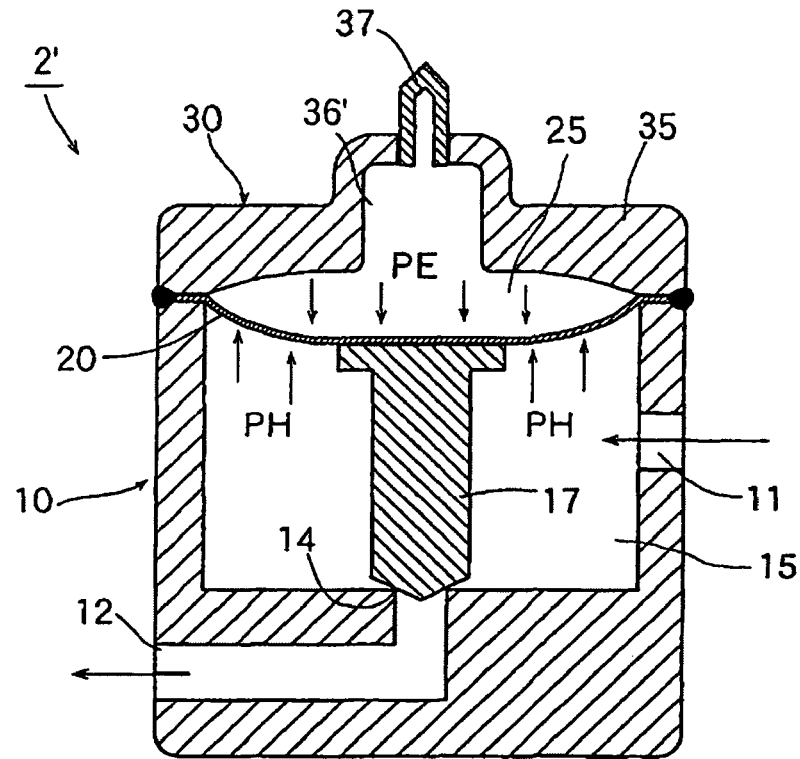
FIG. 4 is a sectional view showing an embodiment in which the specification of the pressure control valve shown in FIG. 3 is changed.
Figure 4B:
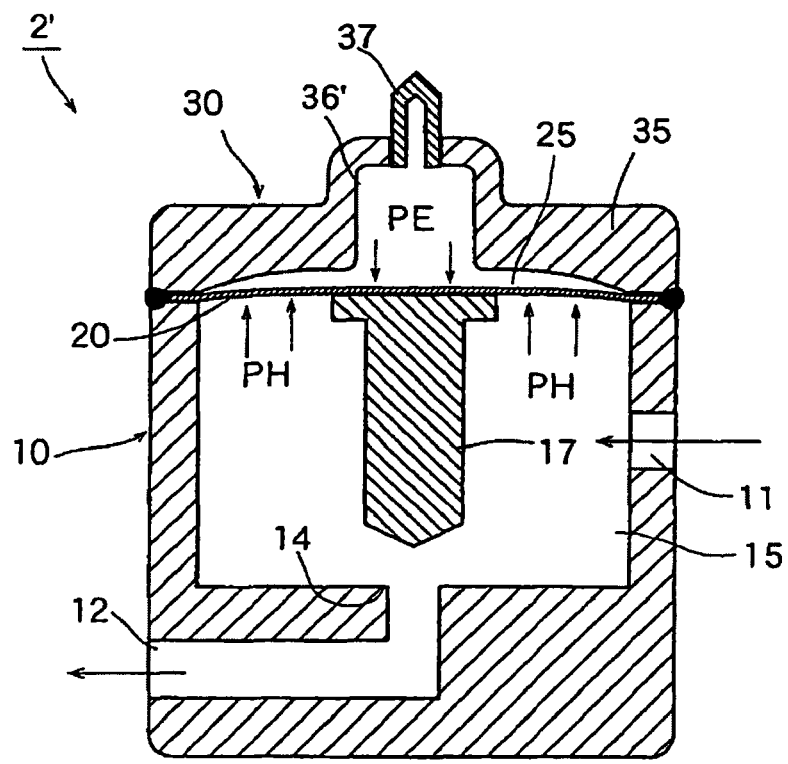

In addition, since the sealed pressure chamber 25 is expanded by providing the vertical hole 18 with the upper surface opening in the valve body 17, and forming the lid-like member 35 in a concave shape to have the concave portion 36, a desired control characteristic can be obtained only by changing dimensions of the vertical hole 18 or the concave portion 36 provided in one member (the valve body 17 or the lid member 35). In other words, in the case of manufacturing plural kinds of pressure control valves having different specifications (control characteristics), the other members can be used in common only by changing one member (the valve body 17 or the lid member 35), and it is thus possible to reduce a manufacturing cost. An example in which a vertical hole 18 is made large is shown in a pressure control valve 1' in FIG. 2. Further, examples in which dimensions of the concave portions 36 and 36' are different are shown in pressure control valves 2 and 2' in FIGS. 3 and 4.

Figure 7:
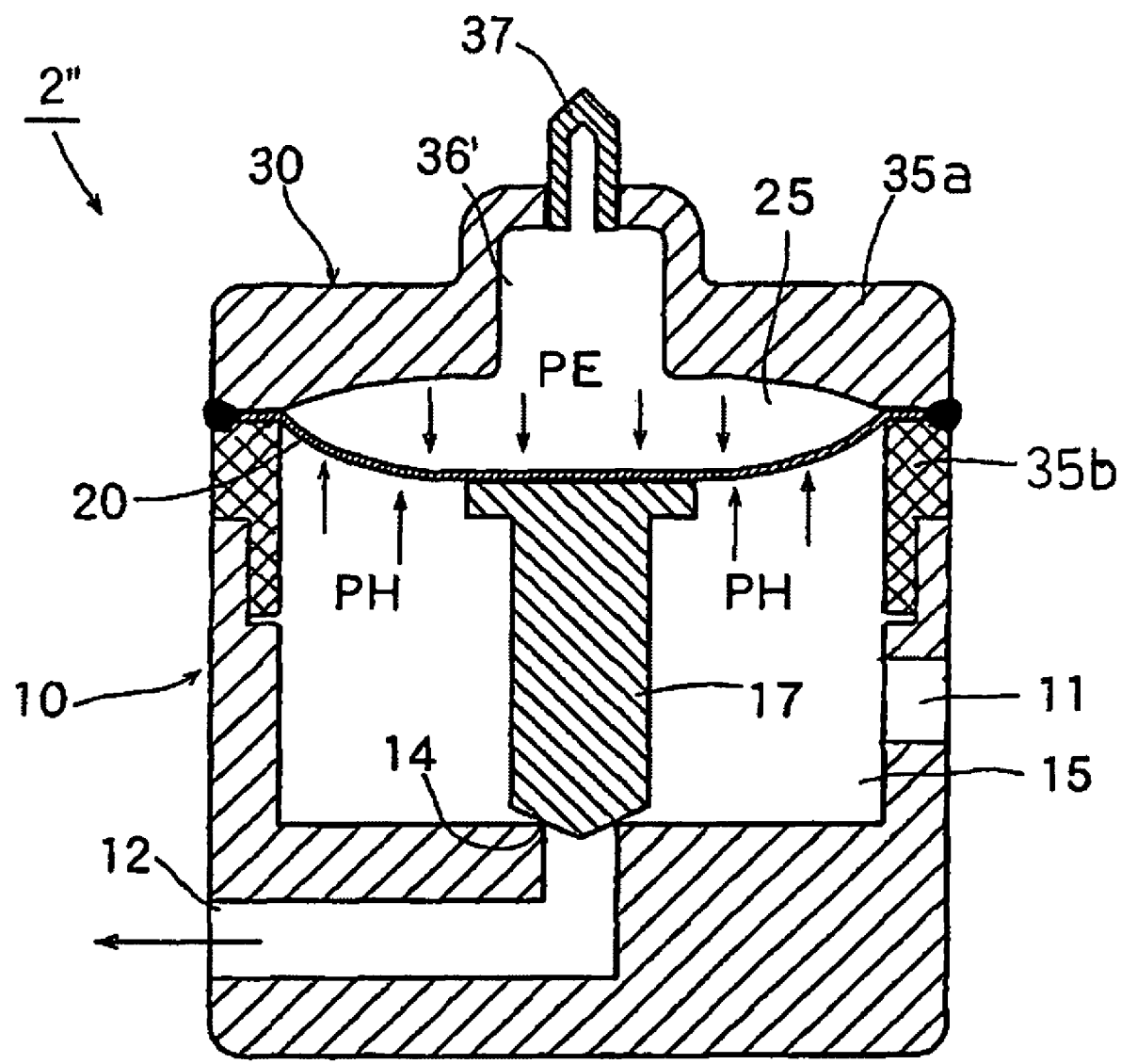
FIG. 7 is a sectional view showing another embodiment of the pressure control valve in accordance with the present invention.

Further, a pressure control valve 2'' in FIG. 7 shows an example in which the lid-like member 35 is structured such as to be divided into an upper member 35a at an upper side of the diaphragm 20 and a lower member 35b at a lower side thereof. In this case, the lower member 35b and the valve main body 10 are coupled in accordance with screw coupling or another method. The member coming into contact with the diaphragm 20 is constructed by a material such as SUS or the like which are suitable for welding the diaphragm 20, however, since another inexpensive material than the material mentioned above can be used for the valve main body in this example, it is possible to achieve reduction of the manufacturing cost.

What is claimed is:

1. A pressure control valve comprising:
   a valve main body provided with a valve chamber having a valve seat portion which a rod-shaped valve body moves close to and away from, an inflow port, and an outflow port; and
   a pressure response element having a diaphragm defining an upper surface of said valve chamber and driving said valve body in an opening and closing direction, and a lid-like member defining a sealed pressure chamber in cooperation with said diaphragm,
   wherein an inert gas having a thermal expansion coefficient equal to or less than a predetermined value is enclosed within said sealed pressure chamber, and an internal volume of said sealed pressure chamber is set such that said valve body comes to a full-open state in the case that the pressure of said valve chamber becomes a predetermined pressure or more higher than the pressure at which said valve body starts opening; and
   wherein the internal volume of said sealed pressure chamber is set such that a ratio Vmin/Vmax becomes equal to or less than 0.7, where Vmax denotes an internal volume of said sealed pressure chamber at a time when said valve body is in a full-close state, and Vmin denotes an internal volume of said sealed pressure chamber at a time when said valve body is in a full-open state; and
   wherein a connection hole is formed in said diaphragm, and an upper end portion of said valve body is bonded to said diaphragm, said valve body being provided with a vertical hole with an upper surface opening, and said vertical hole with an upper surface opening being in alignment with said connection hole whereby said sealed pressure chamber and said vertical hole are in communication through said connection hole to expand said sealed pressure chamber.

2. A pressure control valve as claimed in claim 1, wherein a single gas or a mixed gas is used as said inert gas.

3. A pressure control valve as claimed in claim 2, wherein said single gas is nitrogen or helium.

* * * * *